United States Patent
Oka (10) Patent No.: US 7,744,966 B2
(45) Date of Patent: Jun. 29, 2010

(54) PRODUCTION PROCESS OF PERPENDICULAR MAGNETIC RECORDING MEDIUM

(75) Inventor: Masahiro Oka, Yokohama (JP)

(73) Assignee: Showa Denko K.K., Tokyo (JP)

( * ) Notice: Subject to any disclaimer, the term of this patent is extended or adjusted under 35 U.S.C. 154(b) by 213 days.

(21) Appl. No.: 11/886,185

(22) PCT Filed: Mar. 16, 2006

(86) PCT No.: PCT/JP2006/305764

§ 371 (c)(1),
(2), (4) Date: Sep. 12, 2007

(87) PCT Pub. No.: WO2006/098504

PCT Pub. Date: Sep. 21, 2006

(65) Prior Publication Data

US 2008/0199733 A1      Aug. 21, 2008

Related U.S. Application Data

(60) Provisional application No. 60/665,371, filed on Mar. 28, 2005.

(30) Foreign Application Priority Data

Mar. 17, 2005   (JP)   ............... 2005-077916

(51) Int. Cl.
*H05H 1/24* (2006.01)
(52) U.S. Cl. .............. 427/577; 427/128; 427/130; 427/131; 427/132; 427/376.6
(58) Field of Classification Search .......... 427/450, 427/577, 128, 130, 132, 131, 376.6
See application file for complete search history.

(56) References Cited

U.S. PATENT DOCUMENTS 5,679,473 A    10/1997   Murayama et al.

(Continued)

FOREIGN PATENT DOCUMENTS

JP    7-311929 A    11/1995

(Continued)

OTHER PUBLICATIONS

Matsumoto, Koji, "Perpendicular Magnetic Recording Using Magneto-Optical Media". FUJITSU Sci. Tech. J., 37, 2, pp. 155-163, Dec. 2001.*

(Continued)

*Primary Examiner*—Bret Chen
(74) *Attorney, Agent, or Firm*—Sughrue Mion, PLLC (57) ABSTRACT

A production process of magnetic recording media is provided in which, when using an oxide magnetic material as a perpendicular magnetic recording layer and forming a carbon protective layer using a plasma CVD method, stripping of the carbon protective layer and separation of a lubrication layer can be prevented, and satisfactory recording and reproduction characteristics can be obtained. In the production process of magnetic recording media, the magnetic recording media consists of, at least, a substrate 1 on which are provided a perpendicular magnetic recording layer and a carbon protective layer, in which the perpendicular magnetic recording layer consists of magnetic material containing a Co alloy and oxide material; the method includes a perpendicular magnetic recording layer formation process of forming the perpendicular magnetic recording layer on the substrate 1, a heating process of using a heating portion 28 to heat the substrate 1 on which the perpendicular magnetic recording layer has been formed, and a protective layer formation process of using a plasma CVD method to form a carbon protective layer on the substrate 1 on which the perpendicular magnetic recording layer has been formed.

1 Claim, 3 Drawing Sheets

U.S. PATENT DOCUMENTS

| | | | |
|---|---|---|---|
| 6,156,404 | A | 12/2000 | Ross et al. |
| 6,455,101 | B1 * | 9/2002 | Sasaki et al. ............... 427/130 |
| 7,067,206 | B2 | 6/2006 | Uwazumi et al. |
| 2002/0028286 | A1 | 3/2002 | Sasaki et al. |
| 2003/0219630 | A1 * | 11/2003 | Moriwaki et al. ....... 428/694 R |
| 2006/0204791 | A1 | 9/2006 | Sakawaki et al. |

FOREIGN PATENT DOCUMENTS

| | | |
|---|---|---|
| JP | 10-302242 A | 11/1998 |
| JP | 2001-43530 A | 2/2001 |
| JP | 2002-32911 A | 1/2002 |
| JP | 2003-077122 A | 3/2003 |
| JP | 2003-331411 * | 11/2003 |
| WO | WO 2004/032121 * | 4/2004 |
| WO | WO 2004/090874 * | 10/2004 |
| WO | WO 2004/090874 A1 | 10/2004 |

OTHER PUBLICATIONS

Matsumoto, Koji, et al., "Improvement of Recording Density of Amorphous TbFeCo Magnetic Recording Layer on FeC Soft Magnetic Back Layer". Jpn. J. Appl. Phys. vol. 41 2002), pp. L691-L693.*

T. Oikawa et al., "$SiO_2$ composition of $CoPtCr-SiO_2/Ru$ perpendicular magnetic recording media and grain isolation", Journal of the Applied Magnetic Society, 2005, p. 231-234, vol. 29, No. 3.

Satoshi Matsunuma et al., "CoCrPt alloy-oxide perpendicular magnetic recording media with a new structure incorporating an intermediate layer", Technical Report of the Institute of Electronic, Information and Communication Engineers, Jul. 2004, pp. 19-23, MR2004-10.

Ohtsuki et al., "Development of perpendicular magnetic recording media for an HDD aiming at 400 gbits/$inch^2$", Nikkei Electronics, Jan. 19, 2004, pp. 115-122.

* cited by examiner

FIG. 7

PRODUCTION PROCESS OF PERPENDICULAR MAGNETIC RECORDING MEDIUM

CROSS REFERENCE TO RELATED APPLICATIONS

This application is an application filed under 35 U.S.C. §111(a) claiming pursuant to 35 U.S.C. §119(e) the benefit of the filing date of Provisional Application 60/665,371 on Mar. 28, 2005. Priority is claimed on Japanese Patent Application No. 2005-077916, filed Mar. 17, 2005.

TECHNICAL FIELD

The present invention relates to magnetic recording media, a production process of such media, and a magnetic recording and reproducing apparatus using such magnetic recording media.

BACKGROUND ART

A perpendicular magnetic recording method is the method which employs a magnetic recording layer in which the easy axis of magnetization is directed perpendicular to the substrate. Compared with the longitudinal magnetic recording method, in perpendicular magnetic recording the demagnetizing field in the vicinity of the magnetization transition region, which is the boundary between recorded bits, is decreased, so that the higher the recording density, the more magnetostatically stable the recorded state, with improved resistance to thermal fluctuations; hence the method is appropriate for increasing areal densities.

In particular, when a soft magnetic underlayer, consisting of soft magnetic material, is provided between the substrate and the perpendicular magnetic recording layer, the functions of so-called perpendicular double-layer media are obtained, and excellent recording performance can be obtained. At this time, the soft magnetic underlayer serves to provide a return path for the recording magnetic field from the magnetic head, and can improve the recording and reproducing efficiency.

In perpendicular magnetic recording media, generally a soft magnetic underlayer, underlayer, perpendicular magnetic recording layer, and protective layer are formed on a substrate.

Co—Cr system alloys are widely used as the perpendicular magnetic recording material. When using Co—Cr system alloys, normally substrate heating during film deposition causes separation of the magnetic phases and nonmagnetic phases within the magnetic recording layer.

A carbon protective layer formed by a plasma CVD method is widely used as the protective layer.

In recent years, oxide magnetic materials including Co alloys (for example Co—Cr—Pt) and $SiO_2$ or other oxides have come to be used as the material of perpendicular magnetic recording layers.

In oxide magnetic materials, a nonmagnetic phase of an oxide is segregated in such a manner as to surround the magnetic phase, of Co alloy or similar, so that the magnetic crystal grains (magnetic phase) can be isolated and made finer, and the magnetization transition region can be made smaller. As a result, media noise can be reduced (see Non-patent references 1 through 3).

Non-patent reference 1: Oikawa et al. "$SiO_2$ composition of CoPtCr—$SiO_2$/Ru perpendicular magnetic recording media and grain isolation", Journal of the Applied Magnetic Society Japan, 29, 231-234 (2005).

Non-patent reference 2: Matsunuma et al, "CoCrPt alloy-oxide perpendicular magnetic recording media with a new structure incorporating an intermediate layer", Technical Report of the Institute of Electronic, Information and Communication Engineers, MR2004-10.

Non-patent reference 3: Ohtsuki and Uwazumi "Development of perpendicular magnetic recording media for an HDD aiming at 400 Gbits/inch$^2$", Nikkei Electronics, Jan. 19, 2004.

DISCLOSURE OF THE INVENTION

However, in magnetic recording media obtained by a manufacturing method of the prior art, separation of a carbon protective layer has occurred. Moreover, adhesion of a lubrication layer to the surface of the carbon protective layer has been poor, and over long periods of use a portion of the lubrication layer has adhered to the head slider.

The present invention was devised in light of the above circumstances, and has as an object the provision of a magnetic recording media production process, magnetic recording media, and magnetic recording and reproducing apparatus which, when using an oxide magnetic material in the perpendicular magnetic recording layer, and when forming the carbon protective layer by the plasma CVD method, can prevent separation of the carbon protective layer and head adhesion of lubricating material, and enables satisfactory recording and reproduction characteristics.

In order to attain the above object, the present invention adopts the following configurations.

(1) A first invention to resolve the above problems is a method of manufacture of magnetic recording media in which at least a perpendicular magnetic recording layer and a carbon protective layer are provided on a substrate, and in which the perpendicular magnetic recording layer contains a magnetic material which includes a Co alloy and an oxide material, and is characterized in having a perpendicular magnetic recording layer formation process of forming a perpendicular magnetic recording layer on the substrate; a heating process of heating the substrate on which is formed the perpendicular magnetic recording layer; and a protective layer formation process of forming the carbon protective layer by the plasma CVD method on the substrate on which is formed the perpendicular magnetic recording layer.

(2) A second invention to resolve the above problems is the method of manufacture of magnetic recording media described in (1) above, characterized in that the heating temperature in the heating process is higher than the film deposition temperature when forming the carbon protective layer in the protective layer formation process.

(3) A third invention to resolve the above problems is the method of manufacture of magnetic recording media described in (1) or (2) above, characterized in that in the perpendicular magnetic recording layer formation process, the temperature during formation of the perpendicular magnetic recording layer is less than 80° C., and in that the heating temperature in the heating process is set such that the film deposition temperature during formation of the carbon protective layer is 80° C. or higher.

(4) A fourth invention to resolve the above problems is the method of manufacture of magnetic recording media described in any one among (1) through (3) above, characterized in that the perpendicular magnetic recording layer has a structure in which a nonmagnetic layer, consisting of an oxide material, surrounds a magnetic layer, consisting of a Co alloy.

(5) A fifth invention to resolve the above problems is the method of manufacture of magnetic recording media described in any one among (1) through (4) above, characterized in that the oxide material is any one of, or is two or more among, $SiO_2$, $TiO$, $TiO_2$, $ZrO_2$, $Cr_2O_3$, $CoO$, $Ta_2O_5$, and $Al_2O_3$.

(6) A sixth invention to resolve the above problems is magnetic recording media, characterized in having been manufactured by the method of manufacture of magnetic recording media described in any one among (1) through (5).

(7) A seventh invention to resolve the above problems is a magnetic recording and reproducing apparatus, characterized in being provided with the magnetic recording media described in (6), and a magnetic head for recording information onto and reproducing information from the magnetic recording media.

According to the present invention, after forming a perpendicular magnetic recording layer from an oxide magnetic material, the substrate is heated and the plasma CVD method is used to form the carbon protective layer, so that perpendicular magnetic recording layer with excellent recording and reproducing characteristics is obtained, and a carbon protective layer can be formed with high density and excellent adhesion properties.

BEST MODE FOR CARRYING OUT THE INVENTION

Figure 1:
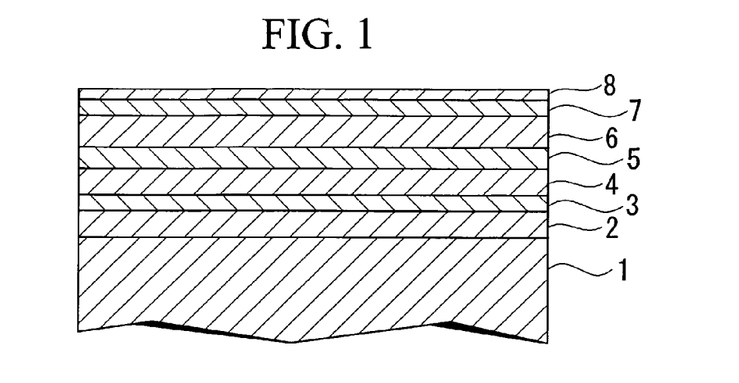
FIG. 1 is a cross-sectional view showing a first example of magnetic recording media of the present invention.

FIG. 1 shows a first example of magnetic recording media of the present invention.

This magnetic recording media is configured by forming on a substrate 1, in order, a first soft magnetic layer 2; an antiferromagnetic layer 3; a second soft magnetic layer 4; an alignment control layer 5; a perpendicular magnetic recording layer 6; a carbon protective layer 7; and a lubrication layer 8.

Figure 2:
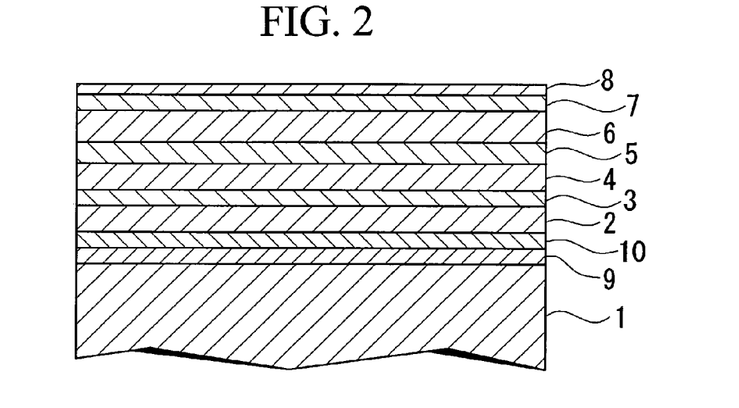
FIG. 2 is a cross-sectional view showing a second example of magnetic recording media of the present invention.

FIG. 2 shows a second example of magnetic recording media of the present invention.

This magnetic recording media is configured similarly to the magnetic recording media shown in FIG. 1, except for the provision of a pinning underlayer 9 and pinning layer 10 between the substrate 1 and the first soft magnetic layer 2.

As the substrate, a metal substrate consisting of aluminum, an aluminum alloy, or another metal material may be used; or, a nonmetallic substrate consisting of glass, a ceramic material, silicon, silicon carbide, carbon, or another nonmetallic material may be used.

As a glass substrate, either an amorphous glass or a crystallized glass may be used; as an amorphous glass, general-purpose soda lime glass or an aluminosilicate glass may be used. As a crystallized glass, a lithium crystallized glass may be used. As a ceramic substrate, a sinter the main component of which is general-purpose aluminum oxide, aluminum nitride, silicon nitride or similar, as well as fiber-reinforced versions of these, and similar can be used.

The substrate size is arbitrary. For example, substrates of diameter 95 mm, 65 mm, 48 mm, 27.4 mm, 21.6 mm, and similar can be used.

When the substrate has an average surface roughness Ra of 2 nm or less, and preferably 1 nm or less, then the head flying height can be lowered, and so the media is appropriate for high-density recording.

Further, when surface waviness Wa in the substrate surface are held to 0.3 nm or less, and preferable to 0.25 nm or less, then the head flying height can be lowered, and so the media is appropriate for high-density recording. Surface waviness Wa can be measured by for example using a surface roughness measurement apparatus P-12 (manufactured by KLA-Tencor), measured as the average surface roughness over a measurement range of 80 μm.

For purposes of maintaining stable flight of the magnetic head, it is preferable that a substrate be used in which at least one surface among the chamfer surface on the end face and the side face portion have an average surface roughness Ra of 10 nm or less, and more preferably of 9.5 nm or less.

The pinning underlayer is provided to arrange the crystal structure of the pinning layer; as the material of the pinning underlayer, Cr or a Cr alloy can be used. Examples of Cr alloys include CrMo, CrTi, CrW, CrV, CrSi, and CrNb system alloys.

The pinning layer consists of a hard magnetic material, such as a Co—Cr—Pt—B alloy, or a Co—Sm alloy. Because the coercive force of the pinning layer is far greater than that of a soft magnetic layer, movement of domain walls within the soft magnetic layer can be suppressed.

It is preferable that the coercive force Hc of the pinning layer be 500 Oe or greater (and more preferable still that the coercive force be 1000 Oe or greater). One Oe is approximately equal to 79 A/m.

Soft magnetic layers are also called soft magnetic underlayers, and in the examples shown in FIG. 1 and FIG. 2 corresponds to the first soft magnetic layer 2 and the second soft magnetic layer 4.

As the soft magnetic material used in soft magnetic layers, a material containing at least one among Fe, Ni, and Co can be used. As this material, an FeCo alloy (FeCo, FeCoB, or similar), an FeNi alloy (FeNi, FeNiMo, FeNiCr, FeNiSi, or similar), an FeAl alloy (FeAl, FeAlSi, FeAlSiCr, FeAlSiTiRu, FeAlO, or similar), an FeCr alloy (FeCr, FeCrTi, FeCrCu, or similar), an FeTa alloy (FeTa, FeTaC, FeTaN, or similar), an FeMg alloy (FeMgO or similar), an FeZr alloy (FeZrN or similar), an FeC alloy, an FeN alloy, an FeSi alloy, an FeP alloy, an FeNb alloy, an FeHf alloy, an FeB alloy, a CoB alloy, a CoP alloy, a CoNi alloy (CoNi, CoNiB, CoNiP or similar), an FeCoNi alloy (FeCoNi, FeCoNiP, FeCoNiB, or similar), or others can be used.

As the material of the soft magnetic layers, it is preferable that a Co alloy containing 80 at % or more Co, and containing at least one among Zr, Nb, Ta, Cr, Mo or similar, be used. This Co alloy can be selected as appropriate from among CoZr, CoZrNb, CoZrTa, CoZrCr, CoZrMo, or other alloys.

A material which is an alloy containing 60 at % or more Fe (FeAlO, FeMgO, FeTaN, FeZrN, or similar), and having a fine crystal structure or a granular structure, may also be used. A granular structure is a structure in which fine crystal grains are surrounded by the parent material.

It is preferable that the soft magnetic layers have an amorphous structure or a fine crystal structure. This is because when the soft magnetic layers have an amorphous structure or a fine crystal structure, the surface roughness is not worsened, nor is the crystal orientation of the perpendicular magnetic recording layer worsened.

It is preferable that the coercive force Hc of the soft magnetic layers be 20 Oe or less (and more preferable that the value be 10 Oe or less).

It is preferable that the saturation flux density Bs of the soft magnetic layers be 0.6 T or greater (and more preferable that the value be 1 T or greater).

It is preferable that the sum of the products Bs·t of the saturation flux density Bs and layer thickness t of the soft magnetic layers be 20 T·nm or greater, and still more preferable that the value be 40 T·nm or greater. When Bs·t is lower than the above range, the OW characteristics are worsened, which is undesirable.

It is preferable that the layer thickness of the soft magnetic layers be 120 nm or less, and more preferable that the thickness be 80 nm or less. By holding the soft magnetic layer thickness in the above range, surface properties are made satisfactory, and the occurrence of characteristic degradation and worsening of manufacturing properties is prevented.

A portion of the entirety of the surface of the uppermost soft magnetic layer may be oxidized. When the number of soft magnetic layers is one, the uppermost soft magnetic layer is the only soft magnetic layer; when there is a plurality of soft magnetic layers, the uppermost soft magnetic layer is the soft magnetic layer among these which is uppermost. In the examples shown in FIG. 1 and FIG. 2, the uppermost soft magnetic layer is the second soft magnetic layer 4.

The antiferromagnetic layer is provided in order to align the magnetization direction in soft magnetic layers through exchange coupling with the soft magnetic layers. It is preferable that the magnetization direction be the substrate radial direction.

It is preferable that the material of the antiferromagnetic layer be an MnIr system alloy or an MnFe system alloy. When using an MnIr system alloy or an MnFe system alloy, by depositing the soft magnetic layers and the antiferromagnetic layer in a magnetic field, exchange coupling can be induced between the soft magnetic layers and the antiferromagnetic layer, and so processes of annealing in a magnetic field after deposition, cooling, and similar become unnecessary, which is desirable.

It is preferable that the thickness of the antiferromagnetic layer be 3 nm or greater and 10 nm or less in the case of an MnIr system alloy. In the case of an MnFe system alloy, a thickness of 10 nm or greater and 30 nm or less is preferable. In particular, when using an MnIr system alloy, and when the thickness of the antiferromagnetic layer is 4 nm or greater and 7 nm or less, the exchange coupling magnetic field can be made sufficiently strong, yet problems due to the layer thickness do not occur.

In the examples shown in FIG. 1 and FIG. 2, an antiferromagnetic layer is provided only between the first soft magnetic layer 2 and the second soft magnetic layer 4; in addition to this configuration, an antiferromagnetic layer can also be formed below the first soft magnetic layer 2.

When depositing soft magnetic films and an antiferromagnetic film which is exchange-coupled with the former, it is preferable that the direction of the magnetic field during deposition be adjusted in order that the magnetization directions are different. For example, when the magnetization directions of the soft magnetic layers and the antiferromagnetic layer are in the substrate radial direction and antiparallel, manufacturing is facilitated, which is desirable.

In the present invention, in place of an antiferromagnetic layer, an intermediate layer can be provided between two soft magnetic layers to form demagnetizing field coupling. The intermediate layer consists of Ru or a Ru alloy.

Soft magnetic layers easily form magnetic domains, and magnetic domains are a source of spike noise; but an intermediate layer can suppress the occurrence of domain walls in soft magnetic layers through the bias magnetic field due to demagnetizing field coupling, so that noise can be reduced.

A soft magnetic crystalline underlayer consisting of a soft magnetic material can be formed below the antiferromagnetic layer. For example, in the examples shown in FIG. 1 and FIG. 2, a soft magnetic crystalline underlayer can be formed between the antiferromagnetic layer 3 and the first soft magnetic layer 2.

A soft magnetic crystalline underlayer is provided to improve the crystallinity of the antiferromagnetic layer and to increase the exchange coupling magnetic field. It is preferable that the soft magnetic crystalline underlayer consist of a material having an fcc or hcp structure. In particular, Ni—Fe system alloys and Co—Fe system alloys are ideal.

Because the soft magnetic crystalline underlayer consists of a soft magnetic material, exchange coupling occurs between the antiferromagnetic layer and a soft magnetic layer provided on the substrate side of the soft magnetic crystalline underlayer.

The alignment control layer is provided to control the alignment of the perpendicular magnetic recording layer and the diameters of crystal grains.

As the material of the alignment control layer, Ru or an Ru alloy is preferable.

As an Ru alloy, an oxide system material containing Ru and an oxide can be used. Oxides may be any one of, or two or more among, $SiO_2$, $Al_2O_3$, $Cr_2O_3$, CoO, and $Ta_2O_5$. When using an oxide system material, the alignment control layer can have a granular structure in which grains containing Ru are surrounded by a parent material which is an oxide material. It is desirable that the composition of the alignment control layer be determined such that recording and reproduction characteristics are optimal. A magnetic material may be used in the alignment control layer, but no stipulations in particular are made.

It is preferable that the saturation magnetization Ms of the alignment control layer be from 0 to 200 emu/cc. When the Ms of the alignment control layer exceeds 200 emu/cc, noise arising from the alignment control layer may cause worsening of the recording and reproduction characteristics. One emu/cc is approximately equal to $12.57 \cdot 10^{-4}$ $Wb/m^2$.

It is preferable that the thickness of the alignment control layer be 3 nm or greater but 30 nm or less, and more preferable still that the thickness be 10 nm or greater but 20 nm or less. When the alignment control layer thickness is within this range, alignment of the perpendicular magnetic recording layer is good, and the distance between the magnetic head and the soft magnetic layers during recording can be made small, so that recording and reproduction characteristics can be enhanced without a drop in the resolution of reproduced signals.

A seed layer can be formed below the alignment control layer.

It is preferable that the seed layer be of an NiTa alloy, NiNb alloy, NiTaC alloy, NiTaB alloy, CoNiTa alloy, NiFe alloy, NiFeMo alloy, NiFeCr alloy, NiFeV alloy, or NiCo alloy.

By forming a seed layer, the crystal orientation of the alignment control layer can be made satisfactory, and the crystal structure of the perpendicular magnetic recording layer can be adjusted.

The easy axis of magnetization of the perpendicular magnetic recording layer is aligned principally in the direction perpendicular to the substrate. For the axis to be aligned principally in the perpendicular direction means that the coercive force in the perpendicular direction Hc(P) and the coercive force in longitudinal directions Hc(L) satisfy the relation Hc(P)>Hc(L).

A magnetic material containing at least a Co alloy and an oxide (hereafter called an oxide-system magnetic material) is used in the perpendicular magnetic recording layer.

The perpendicular magnetic recording layer has a granular structure, which is a structure in which a nonmagnetic phase, consisting of the oxide material, surrounds a magnetic phase (magnetic particles), consisting of the Co alloy. In perpendicular magnetic recording layer with a granular structure, numerous magnetic phase particles are dispersed in the nonmagnetic phase. As a result, the magnetization transition regions that are a source of media noise are made as small as possible, and media noise can be reduced.

As the Co alloy, it is preferable that a Co—Pt system alloy, and in particular a Co—Cr—Pt system alloy be used.

As the oxide material, it is preferable that one of, or two or more among, $SiO_2$, $TiO$, $TiO_2$, $ZrO_2$, $Cr_2O_3$, $CoO$, $Ta_2O_5$, and $Al_2O_3$ be used.

As the oxide magnetic material, it is preferable that Co—Cr—Pt—$SiO_2$ or Co—Cr—Pt—$Cr_2O_3$ be used.

It is preferable that the Cr content be 5 at % or higher and 30 at % or lower (and more preferable that the content be 8 at % or higher and 15 at % or lower); and it is preferable that the Pt content be 10 at % or higher and 22 at % or lower (and more preferable that the content be 13 at % or higher and 20 at % or lower).

It is preferable that the oxide material content be 2 mol % or higher and 15 mol % or lower (and more preferable that the content be 4 mol % or higher and 12 mol % or lower).

When the Cr or oxide material content is lower than the above ranges, the exchange coupling with the magnetic phase (magnetic particles) consisting of the Co alloy becomes strong, magnetic cluster diameters increased, and noise increases, which is undesirable. When the Cr or oxide material content exceeds the above ranges, the coercive force and Mr/Ms decline. Mr is the residual magnetization, and Ms is the saturation magnetization.

When the Pt content is lower than the above range, the effect of improving the recording and reproduction characteristics is inadequate, and the Mr/Ms declines, so that resistance to thermal fluctuations may be worsened. When the Pt content exceeds the above range, noise may be increased.

The perpendicular magnetic recording layer may have a single-layer structure, or may have a structure of two or more layers of materials with different compositions.

A thickness for the perpendicular magnetic recording media of 5 nm or greater and 20 nm or less is appropriate (and a thickness of 10 nm or greater and 16 nm or less is more preferable). When the thickness of the perpendicular magnetic recording layer is 5 nm or greater, sufficient magnetic flux can be obtained, and during reproduction the output waveform is clear without a drop in output, so that the media is suitable for high-density recording. When the thickness of the perpendicular magnetic recording layer is 20 nm or less, coarsening of the magnetic phase (magnetic particles) can be suppressed, so that degradation of recording and reproduction characteristics such as increases in noise do not readily occur.

It is preferable that the coercive force of the perpendicular magnetic recording layer be 4000 Oe or greater. When the coercive force is lower than this range, the resolution and resistance to thermal fluctuations are reduced.

When the Mr/Ms of the perpendicular magnetic recording layer is made greater than or equal to 0.95, good resistance to thermal fluctuations can be obtained.

When the reverse domain nucleus formation magnetic field (−Hn) of the perpendicular magnetic recording layer is 1000 or greater, good resistance to thermal fluctuations can be obtained.

It is preferable that in the perpendicular magnetic recording layer, the average grain diameter in the magnetic phase (magnetic particles) consisting of a Co alloy be 4 nm or more but 8 nm or less. This average grain diameter can for example be determined by using TEM (transmission electron microscopy) to observe the perpendicular magnetic recording layer, and performing image processing of the observed image.

A plurality of perpendicular magnetic recording layers can also be formed.

The carbon protective layer prevents corrosion of the perpendicular magnetic recording layer as well as preventing damage to the media surface upon contact of the media with the magnetic head, and is formed from carbon.

The carbon protective layer is formed by the plasma CVD method.

It is desirable that the thickness of the carbon protective layer be 1 nm or greater and 10 nm or less; a thickness of 1 nm or greater and 5 nm or less is ideal. By setting the thickness of the carbon protective layer in this range, the distance between the head and the perpendicular magnetic recording layer can be made small, which from the standpoint of high-density recording is desirable.

The carbon protective layer can be formed at least in part by the plasma CVD method, and can for example be configured to have a first carbon layer formed by the plasma CVD method and a second carbon layer formed by a sputtering method.

It is preferable that the lubrication layer use a perfluoropolyether, fluoride alcohol, fluoride carboxylate, or similar lubricating agent.

Next, a method of manufacture of magnetic recording media of the present invention is explained.

Figure 3:
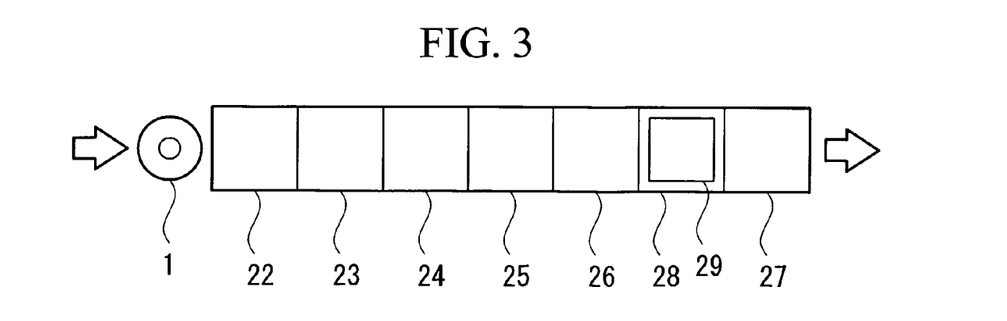
FIG. 3 shows the configuration of a manufacturing apparatus used to manufacture the magnetic recording media shown in FIG. 1.

FIG. 3 shows an example of a manufacturing apparatus which can be used in a method of manufacture of magnetic recording media of the present invention. This manufacturing apparatus is a film deposition system provided with a first soft magnetic layer formation chamber 22, for formation of a first soft magnetic layer 2 on substrate 1; an antiferromagnetic layer formation chamber 23, for formation of an antiferromagnetic layer 3; a second soft magnetic layer formation chamber 24, for formation of a second soft magnetic layer 4; an alignment control layer formation chamber 25, for formation of an alignment control layer 5; a perpendicular magnetic recording layer formation chamber 26, for formation of a perpendicular magnetic recording layer 6; a heating portion 28; and a protective layer formation chamber 27, for formation of a carbon protective layer 7.

The formation chambers 22 to 26 are designed to deposit layers using sputtering or another method. When employing a sputtering method, a sputtering target containing at least in part the material of the layer to be formed is provided within the formation chambers 22 to 26.

The conditions of operation when depositing layers using sputtering methods can for example be as follows.

The substrate is placed in a formation chamber, and the formation chamber is evacuated to a pressure of $10^{-4}$ to $10^{-7}$ Pa. Ar or another sputtering gas is leaked into the formation chamber, and a layer is deposited by supplying electricity to the sputtering target. As the film deposition method, vacuum evaporation deposition, an ion beam method, and similar may be used.

Below, an example of a method of manufacture of the present invention is explained, taking as an example the case of manufacture of the magnetic recording media shown in FIG. 1.

As shown in FIG. 3, the substrate 1 is placed in the first soft magnetic layer formation chamber 22, and a sputtering method or similar is used to form the first soft magnetic layer 2.

Then, after passing through the formation chamber 22, the substrate 1 is placed in the antiferromagnetic layer formation chamber 23, and sputtering or another method is used to form the antiferromagnetic layer 3.

Then, after passing through the formation chamber 23, the substrate 1 is placed in the second soft magnetic layer formation chamber 24, and sputtering or another method is used to form the second soft magnetic layer 4.

Then, after passing through the formation chamber 24, the substrate 1 is placed in the alignment control layer formation chamber 25, and sputtering or another method is used to form the alignment control layer 5.

During film deposition in the formation chambers 22 to 25, it is preferable that when using materials other than oxide system materials, the layer be deposited with the substrate 1 in a heated state. The heating temperature can for example be from 100 to 400° C.

Then, after passing through the formation chamber 25, the substrate 1 is placed in the perpendicular magnetic recording layer formation chamber 26, and sputtering or another method is used to form the perpendicular magnetic recording layer 6, consisting of an oxide system magnetic material, such as for example Co—Cr—Pt—$SiO_2$ or Co—Cr—Pt—$Cr_2O_3$.

The perpendicular magnetic recording layer 6 can be deposited using the above oxide system magnetic material has a sputtering target, or the layer can be deposited by a reactive sputtering method in the presence of sputtering gas containing oxygen as a raw material of the oxide material. The process of formation of the perpendicular magnetic recording layer 6 is called the perpendicular magnetic recording layer formation process.

Because an oxide system magnetic material is used in the perpendicular magnetic recording layer 6, heating of the substrate 1 during deposition is unnecessary. It is preferable that the temperature of the substrate 1 during formation of the perpendicular magnetic recording layer 6 be less than 80° C., and more preferable that the temperature be less than 50° C. By this means, the coercive force, gradation and other magnetic characteristics can be made satisfactory, and excellent recording and reproduction characteristics can be obtained.

The perpendicular magnetic recording layer 6 has a granular structure in which the nonmagnetic phase, consisting of oxide material, surrounds the magnetic phase (magnetic particles) consisting of a Co alloy.

Next, after passing through the formation chamber 26, the substrate 1 is placed in the heating portion 28, and the heater 29 is used for heating. The process of performing heating in the heating portion 28 is called the heating process.

The heating portion 28 is used to raise the temperature of the substrate 1 (hereafter called the "film deposition temperature") during formation of the carbon protective layer 7 in the protective layer formation chamber 27; it is preferable that the heating temperature be set such that the film deposition temperature is 80° C. or higher, or more preferably 100° C. or higher, and still more preferably 200° C. or higher.

In consideration of the possibility that the temperature of the substrate 1 may fall while transporting the substrate 1 from the heating portion 28 to the protective layer formation chamber 27, the heating temperature can be set to a higher temperature than the above-described film deposition temperatures. It is preferable that the heating temperature be set to a temperature which is for example 5 to 20° C. higher than the film deposition temperature. Specifically, a temperature of for example 100° C. or higher can be used.

In consideration of the heat resistance of the substrate 1 or of the film deposition apparatus, the heating temperature can for example be set to 400° C. or lower.

Next, the substrate 1, having been heated in the heating portion 28, is placed in the protective layer formation chamber 27.

The protective layer formation chamber 27 is for example provided with a plasma electrode, a high-frequency power supply to supply high-frequency power to this electrode, and a reactive gas supply source to supply the starting material for the carbon protective layer 7.

With the substrate 1 placed in the protective layer formation chamber 27, the carbon protective layer 7 is formed by the plasma CVD method on the substrate 1, at the above-described film deposition temperature, with the reactive gas as the starting material. As the reactive gas, an organic compound such as acetylene, ethylene, or toluene is used. The process of forming the carbon protective layer 7 is called the protective layer formation process.

When the plasma CVD method is used at low temperature to deposit the carbon protective layer 7 in succession to the perpendicular magnetic recording layer 6, it is difficult to form a carbon protective layer with sufficiently high density and excellent adhesion; but through heating to deposit the carbon protective layer 7 at the above-described film deposition temperature, a carbon protective layer 7 with high density and excellent adhesion can be obtained.

Next, the dipping method or another method is used to apply the lubricating agent onto the carbon protective layer 7 to form the lubrication layer 8, to obtain the above-described magnetic recording media.

According to the above method of manufacture, after forming the perpendicular magnetic recording layer 6 consisting of an oxide system magnetic material, the substrate 1 is heated, and the plasma CVD method is used at the above film deposition temperature to form the carbon protective layer 7.

When forming the perpendicular magnetic recording layer 6, by keeping the temperature low, degradation of the coercive force, gradation and other magnetic characteristics can be prevented, and satisfactory recording and reproduction characteristics can be obtained.

Because an oxide magnetic material is used as the material of the perpendicular magnetic recording layer 6, in contrast with cases in which a Co—Cr system alloy or other non-oxide material is used, the magnetic phase and the nonmagnetic phase can be separated at low temperatures.

When forming the carbon protective layer 7 by the plasma CVD method, film deposition is performed at a high temperature, that is, at a high film deposition temperature, so that there is minimal carbon bonding strain, and a carbon protective layer 7 with high density and excellent adhesion is obtained.

Hence magnetic recording media combining good recording and reproduction characteristics and good durability can be obtained.

Figure 4:
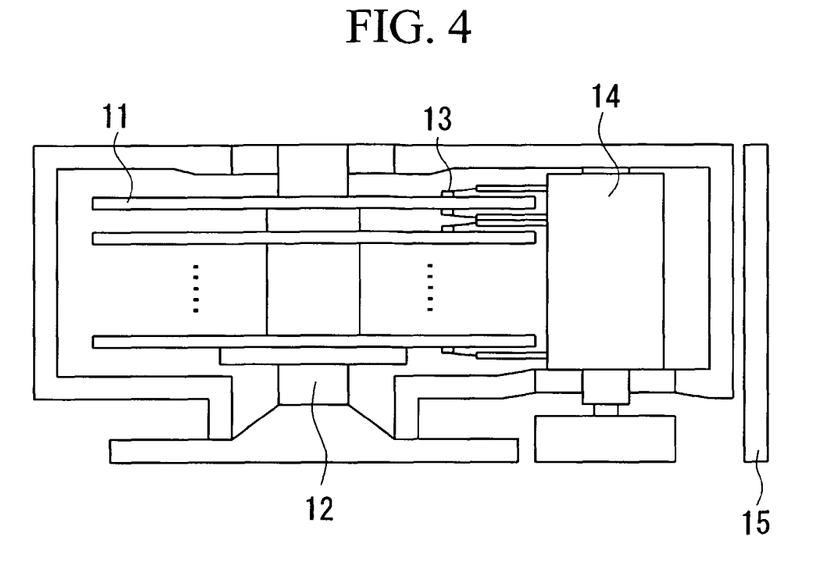
FIG. 4 shows in summary an example of a magnetic recording and reproducing apparatus of the present invention.

FIG. 4 shows an example of a magnetic recording and reproducing apparatus which uses the above magnetic recording media.

The magnetic recording and reproducing apparatus described here is provided with magnetic recording media 11, a spindle motor 12 which drives rotation of the magnetic recording media 11, a magnetic head 13 which records information onto and reproduces information from the magnetic recording media 11, a head actuator 14, and a recording and reproducing signal processing system 15. The recording and reproducing signal processing system 15 processes input data and sends recording signals to the magnetic head 13, and processes reproduced signals from the magnetic head 13 and outputs the data.

EXAMPLE 1

Substrates 1, which were crystallized glass substrates (diameter 48 mm, aperture portion diameter 12 mm, thickness 0.508 mm, average surface roughness Ra=0.5 nm), were prepared. The number of samples was 50.

A DC magnetron sputtering system (Anelva model C-3010) was used to deposit films on the substrate 1 as follows. Film were deposited by first evacuating the formation chamber to $2 \times 10^{-5}$ Pa, then leaking Ar gas into the formation chamber as the sputtering gas, with the Ar gas partial pressure at 0.6 Pa.

A pinning layer 10 (thickness 30 nm) of Co—Cr—Pt—B was deposited on the substrate 1.

Next, a first soft magnetic layer 2 of FeCo (thickness 100 nm) was deposited.

Next, an intermediate layer 3 of Ru (thickness 20 nm) was deposited.

Next, a perpendicular magnetic recording layer 6 of Co—Cr—Pt—$SiO_2$ (thickness 10 nm) was deposited.

The temperature of the substrate 1 during formation of the perpendicular magnetic recording layer 6 was 40° C.

Next, the plasma CVD method was used to deposit a carbon protective layer 7 (thickness 4 nm). The temperature during formation of the carbon protective layer 7 (film deposition temperature) was 40° C.

The surface of the carbon protective layer 7 was subjected to tape burnish treatment. The polishing table used was alumina tape manufactured by 3M; the rolling force was 30 gf (290 mN), the rotation rate was 1000 rpm, and the contact velocity was 0.3 mm/s.

Next, a dipping method was used to form the lubrication layer 8, consisting of a perfluoropolyether. When forming the lubrication layer 8, the lubricating agent concentration and pulling speed were adjusted such that the thickness of the lubrication layer 8 was 1.8 nm.

EXAMPLE 2

As the substrate 1, silicon substrates (diameter 48 mm, aperture portion diameter 12 mm, thickness 0.508 mm, average surface roughness Ra=0.5 nm) were used; otherwise, similar conditions as in example 1 were used to manufacture magnetic recording media.

EXAMPLES 3 TO 14

After forming the perpendicular magnetic recording layer 6, and immediately before forming the carbon protective layer 7, the heater 29 of the heating portion 28 was used to heat the substrate 1; otherwise, conditions similar to those of Example 1 and Example 2 were used to manufacture the magnetic recording media. The heating temperature in the heating portion 28, and the film deposition temperature when forming the carbon protective layer 7, are indicated in Tables 1 and 2. The temperature was detected using an infrared temperature gauge.

REFERENCE EXAMPLE

For reference, longitudinal magnetic recording media provided with a magnetic recording layer not containing oxide material was prepared. In this example, the substrate was heated to approximately 300° C. before preparing each layer, and the temperature was approximately 300° C. when the plasma CVD method was used to form the carbon protective layer.

The 50 samples of each of the examples were placed in a Temperature & Humidity Chamber at a temperature of 80° C. and humidity 90% for one hour. Then, the 50 samples were placed one at a time on a spin stand, and a head was used in ten seek operations.

Table 1 shows adhesion rates, which is the number of surfaces for which adhesion of lubrication material was confirmed among total 50 samples, when head slider surfaces were observed using an optical microscope. Because both sides of each sample were examined, the number of surfaces for the 50 samples was 100.

For each sample, a Heidon 14 type surface measurement apparatus was used, with a load of 100 gf (980 mN) applied to a diamond indenter (conical angle 90°, tip R 25 μm) which was dragged for 30 mm over the surface; Table 1 shows scratch rate, which is the number of surfaces for which scratches in or separation of the carbon protective layer 7 occurred among total 100 surfaces.

Figure 5:
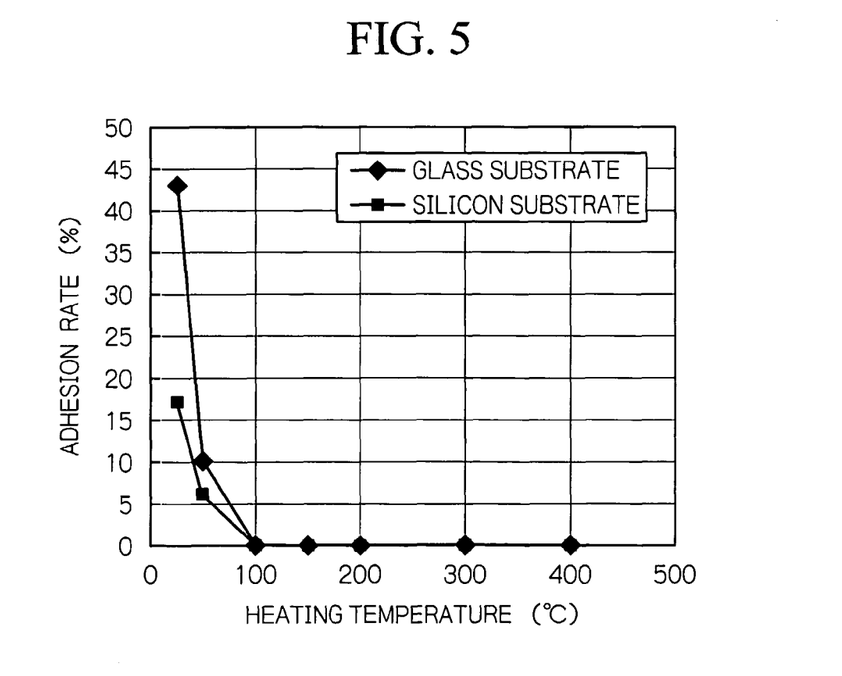
FIG. 5 is a graph showing Example results.
Figure 6:
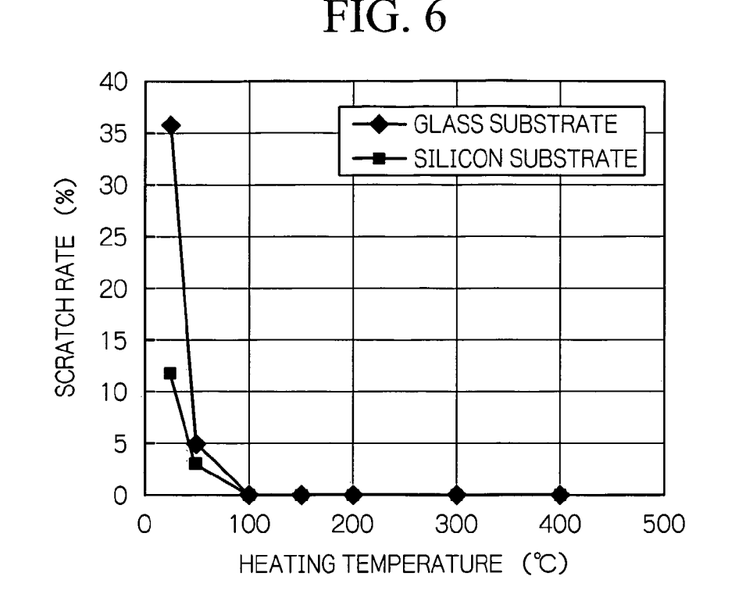
FIG. 6 is a graph showing Example results.

FIG. 5 and FIG. 6 show trends in adhesion rates and scratch rates, as functions of the heating temperature in the heating process.

TABLE 1

| | Substrate | Media | Substrate heating | Heating temperature (° C.) | Film deposition temperature (° C.) | Adhesion rate (%) | Scratch rate (%) |
|---|---|---|---|---|---|---|---|
| Example 1 | crystallized glass | PMRM *1 | no | — | 40 | 43 | 17 |
| Example 2 | silicon | PMRM | no | — | 40 | 36 | 12 |
| Example 3 | crystallized glass | PMRM | yes | 50 | 50 | 10 | 6 |
| Example 4 | silicon | PMRM | yes | 50 | 50 | 5 | 3 |
| Example 5 | crystallized glass | PMRM | yes | 100 | 80 | 0 | 0 |
| Example 6 | silicon | PMRM | yes | 100 | 80 | 0 | 0 |

TABLE 1-continued

| | Substrate | Media | Substrate heating | Heating temperature (° C.) | Film deposition temperature (° C.) | Adhesion rate (%) | Scratch rate (%) |
|---|---|---|---|---|---|---|---|
| Example 7 | crystallized glass | PMRM | yes | 150 | 130 | 0 | 0 |
| Example 8 | silicon | PMRM | yes | 150 | 130 | 0 | 0 |
| Example 9 | crystallized glass | PMRM | yes | 200 | 180 | 0 | 0 |
| Example 10 | silicon | PMRM | yes | 200 | 180 | 0 | 0 |
| Example 11 | crystallized glass | PMRM | yes | 300 | 280 | 0 | 0 |
| Example 12 | silicon | PMRM | yes | 300 | 280 | 0 | 0 |
| Example 13 | crystallized glass | PMRM | yes | 400 | 380 | 0 | 0 |
| Example 14 | silicon | PMRM | yes | 400 | 380 | 0 | 0 |

*1: PMRM = perpendicular magnetic recording media

From Table 1, it is clear that by adopting a heating process in the manufacture of perpendicular magnetic recording media using oxide system magnetic material, adhesion of the lubricating agent on the head slider is dramatically reduced. Further, scratches on the surface of and separation of the carbon protective layer 7 do not readily occur, and the adhesion properties of the carbon protective layer 7 were found to be improved. This is thought to be because the hardness of the carbon protective layer 7 was an appropriate value.

It was found that when the substrate heating temperature is set such that the film deposition temperature for the carbon protective layer 7 is 80° C. or higher, good-quality media can be obtained. It is desirable that the heating temperature be 400° C. or below, in consideration of the thermal resistance of the film deposition apparatus.

In order to compare the quality of the carbon protective layer 7 in the magnetic recording media of the examples and of the reference examples, Raman spectroscopy measurements were performed.

Measurements were performed for five randomly selected samples from among the 50 samples, for three points at every 90° in the circumferential direction at positions at a radius of 22 mm, and the average of the three measurements was taken.

The Id/Ig of the Raman spectroscopy measurements is the ratio of the intensity of the sp2 bond G band to the sp3 bond D band for carbon, and is an index of the carbon bonding state. In general, the smaller the value of Id/Ig, the greater the increase in sp3 bond carbon (with a microscopic diamond structure).

B/A is defined as the peak height including the noise component divided by the peak height, and is an index of the organic component in the layer. The smaller the value of B/A, the smaller is the C—H quantity.

The results of the Raman spectroscopy measurements appear in Table 2.

TABLE 2

| | Substrate | Media | Substrate heating? | Heating temperature (° C.) | Film deposition temperature (° C.) | B/A | Id/Ig |
|---|---|---|---|---|---|---|---|
| Example 1 | crystallized glass | PMRM *1 | no | — | 40 | 1.41 | 0.73 |
| Example 2 | silicon | PMRM | no | — | 40 | 1.43 | 0.7 |
| Example 9 | crystallized glass | PMRM | yes | 200 | 180 | 1.4 | 1.33 |
| Example 10 | silicon | PMRM | yes | 200 | 180 | 1.42 | 1.34 |
| Example 11 | crystallized glass | PMRM | yes | 300 | 280 | 1.33 | 1.88 |
| Example 12 | silicon | PMRM | yes | 300 | 280 | 1.39 | 1.9 |
| Reference Example | crystallized glass | LMRM *2 | yes | — | 300 | 1.44 | 1.9 |

*1: PMRM = perpendicular magnetic recording media
*2: LMRM = longitudinal magnetic recording media From Table 2, it is seen that upon heating the substrate immediately before forming the carbon protective layer 7, the B/A value hardly changes at all. Further, as the heating temperature rises the Id/Ig value increases, and at a heating temperature of approximately 300° C., a level comparable to that of longitudinal magnetic recording media is reached.

Based on this, it is thought that when substrate heating is not performed the Id/Ig value is extremely small, and so the layer hardness is high, layer stress is high, and so poor layer adhesion properties are anticipated. When substrate heating is performed, as the film deposition temperature increases the Id/Ig value rises, the layer becomes relatively soft, and a level comparable to that of longitudinal magnetic recording media is reached. Hence it is thought that layer adhesive properties comparable to those of currently manufactured longitudinal magnetic recording media can be expected.

EXAMPLES 15 TO 28

Other than using CoCrPtTa system alloys as the material of the perpendicular magnetic recording layer 6, the magnetic recording media was manufactured similarly to the Examples 1 through 14. Evaluation results appear in Table 3.

netic recording media which employ an oxide-system perpendicular magnetic recording material.

EXAMPLES 29 TO 36

Other than performing advance substrate heating prior to formation of each layer (hereafter called preheating), perpendicular magnetic recording media were manufactured similarly to those in Example 1.

The preheating was performed in the formation chamber at a pressure of $2\times10^5$ Pa, using a carbon composite heater.

Table 4 shows the preheating temperatures and the temperature when forming the perpendicular magnetic recording layer 6 (film deposition temperature for the perpendicular magnetic recording layer).

Figure 7:
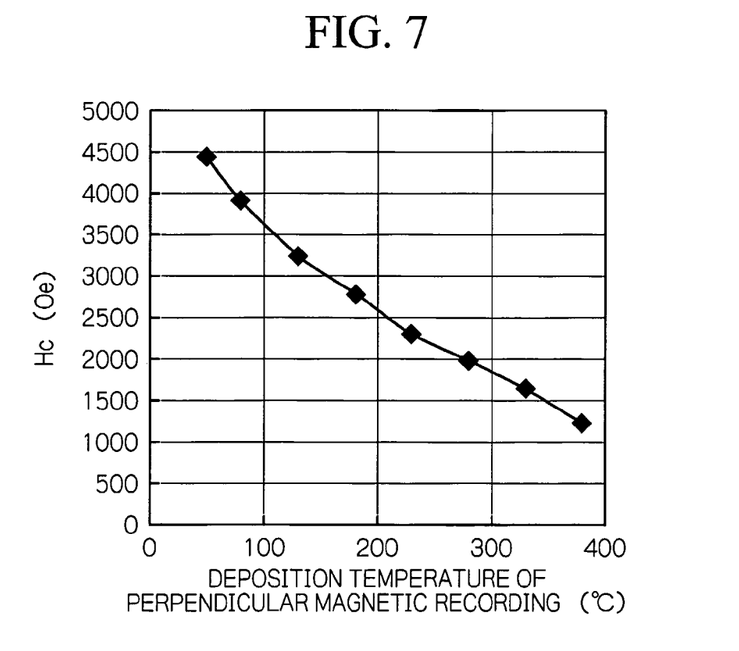
FIG. 7 is a graph showing Example results.

Table 4 and FIG. 7 show the results of measurements of the coercive force Hc in the perpendicular direction at positions at a radius of 15 mm for the samples in each of the examples.

TABLE 3

| | Substrate | Media | Substrate heating | Heating temperature (° C.) | Film deposition temperature (° C.) | Adhesion rate (%) | Scratch rate (%) | Coercive force (Oe) |
|---|---|---|---|---|---|---|---|---|
| Example 15 | crystallized glass | PMRM *1 | no | — | 40 | 39 | 15 | 1002 |
| Example 16 | silicon | PMRM | no | — | 40 | 32 | 10 | 980 |
| Example 17 | crystallized glass | PMRM | yes | 50 | 50 | 6 | 4 | 1110 |
| Example 18 | silicon | PMRM | yes | 50 | 50 | 3 | 2 | 1101 |
| Example 19 | crystallized glass | PMRM | yes | 100 | 80 | 0 | 0 | 1200 |
| Example 20 | silicon | PMRM | yes | 100 | 80 | 0 | 0 | 1240 |
| Example 21 | crystallized glass | PMRM | yes | 150 | 130 | 0 | 0 | 1301 |
| Example 22 | silicon | PMRM | yes | 150 | 130 | 0 | 0 | 1340 |
| Example 23 | crystallized glass | PMRM | yes | 200 | 180 | 0 | 0 | 1385 |
| Example 24 | silicon | PMRM | yes | 200 | 180 | 0 | 0 | 1384 |
| Example 25 | crystallized glass | PMRM | yes | 300 | 280 | 0 | 0 | 1459 |
| Example 26 | silicon | PMRM | yes | 300 | 280 | 0 | 0 | 1430 |
| Example 27 | crystallized glass | PMRM | yes | 400 | 380 | 0 | 0 | 1630 |
| Example 28 | silicon | PMRM | yes | 400 | 380 | 0 | 0 | 1590 |

*1: PMRM = perpendicular magnetic recording media

From Table 3, it is seen that when a Co—Cr—Pt—Ta system alloy, which is a non-oxide magnetic material, is used, similarly to cases in which an oxide magnetic material is used, substrate heating immediately before carbon protective layer formation results in good carbon protective layer adhesion and scratch resistance, and adhesion of the lubricating agent on the head slider can be suppressed.

However, when a non-oxide magnetic material is used, when film deposition is not performed at a high temperature, phase separation within the layer is not promoted, and the coercive force and other magnetic characteristics tend to be inadequate. That is, when substrate heating is performed after deposition of the magnetic recording layer, tribological advantages can be expected, but the magnetic characteristics are worsened. Hence in the present invention advantageous results are obtained in particular from perpendicular mag-

TABLE 4

| Sample | Preheating | Preheating temperature (° C.) | Film deposition temperature of perpendicular magnetic recording layer (° C.) | Coercive force (Oe) |
|---|---|---|---|---|
| Example 29 | no | — | 50 | 4403 |
| Example 30 | yes | 100 | 80 | 3908 |
| Example 31 | yes | 150 | 130 | 3240 |
| Example 32 | yes | 200 | 180 | 2790 |
| Example 33 | yes | 250 | 230 | 2287 |
| Example 34 | yes | 300 | 280 | 1988 |
| Example 35 | yes | 350 | 330 | 1650 |
| Example 36 | yes | 400 | 380 | 1236 |

From Table 4 and FIG. 7 it is seen that when a perpendicular magnetic recording layer consisting of an oxide magnetic material is formed at high temperature, the coercive force is worsened.

In magnetic recording media based on the perpendicular recording method, a coercive force of 4000 Oe or higher is desirable; but when the perpendicular magnetic recording layer is formed at high temperature the coercive force declines, and recording and reproduction characteristics tend to be worsened.

INDUSTRIAL APPLICABILITY

According to the present invention, after forming a perpendicular magnetic recording layer from an oxide magnetic material, the substrate is heated and the plasma CVD method is used to form the carbon protective layer, so that perpendicular magnetic recording layer with excellent recording and reproducing characteristics is obtained, and a carbon protective layer can be formed with high density and excellent adhesion properties.

The invention claimed is:

1. A production process of a magnetic recording medium, which comprises a perpendicular magnetic recording layer and a carbon protective layer on a substrate, wherein the perpendicular magnetic recording layer is formed from a magnetic material containing a Co alloy and an oxide material, comprising:

a perpendicular magnetic recording layer formation process of forming the perpendicular magnetic recording layer on the substrate;

a heating process of heating the substrate on which has been formed the perpendicular magnetic recording layer; and, a protective layer formation process of forming the carbon protective layer by the plasma CVD method on the substrate on which is formed the perpendicular magnetic recording layer, wherein in the perpendicular magnetic recording layer formation process, a temperature during formation of the perpendicular magnetic recording layer is less than 80° C, in the protective layer formation process, a film deposition temperature during formation or the carbon protective layer is 80° C. or higher, the perpendicular magnetic recording layer has a structure in which a nonmagnetic layer, consisting of an oxide material, surrounds a magnetic layer, consisting of a Co alloy, and the oxide material is any one of, or is two or more among, $SiO_2$, $TiO$, $TiO_2$, $ZrO_2$, $Cr_2O_3$, $CoO$, $Ta_2O_5$, and $Al_2O_3$.

* * * * *